(12) United States Patent
Nakanishi et al.

(10) Patent No.: US 10,113,041 B2
(45) Date of Patent: Oct. 30, 2018

(54) FILM AND METHOD FOR PRODUCING SAME

(71) Applicant: DAIKIN INDUSTRIES, LTD., Osaka-shi, Osaka (JP)

(72) Inventors: Koji Nakanishi, Osaka (JP); Yuki Ueda, Osaka (JP); Haruhisa Masuda, Osaka (JP); Kazuki Sakami, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/326,896

(22) PCT Filed: Jul. 16, 2015

(86) PCT No.: PCT/JP2015/070457
§ 371 (c)(1),
(2) Date: Jan. 17, 2017

(87) PCT Pub. No.: WO2016/010127
PCT Pub. Date: Jan. 21, 2016

(65) Prior Publication Data
US 2017/0204233 A1    Jul. 20, 2017

(30) Foreign Application Priority Data

Jul. 18, 2014   (JP) ................ 2014-148074

(51) Int. Cl.
| | | |
|---|---|---|
| C08F 12/20 | (2006.01) | |
| C08F 8/00 | (2006.01) | |
| C08K 5/07 | (2006.01) | |
| C08J 5/18 | (2006.01) | |
| C08L 27/18 | (2006.01) | |
| C08L 71/10 | (2006.01) | |
| H04R 7/02 | (2006.01) | |
| C08L 71/00 | (2006.01) | |
| G10K 13/00 | (2006.01) | |
| C08J 5/22 | (2006.01) | |

(52) U.S. Cl.
CPC ................ *C08J 5/18* (2013.01); *C08J 5/225* (2013.01); *C08L 27/18* (2013.01); *C08L 71/00* (2013.01); *C08L 71/10* (2013.01); *G10K 13/00* (2013.01); *H04R 7/02* (2013.01); *C08G 2650/40* (2013.01); *C08J 2371/10* (2013.01); *C08J 2427/18* (2013.01)

(58) Field of Classification Search
CPC .... C08J 5/18; C08J 2371/101; C08J 2427/18; C08L 71/00; G10K 13/00
USPC .......................... 525/151, 153, 242; 526/242
See application file for complete search history.

(56) References Cited

U.S. PATENT DOCUMENTS

| | | | |
|---|---|---|---|
| 2014/0329087 A1 | 11/2014 | Masuda et al. | |
| 2014/0329968 A1 | 11/2014 | Masuda et al. | |

FOREIGN PATENT DOCUMENTS

| | | | |
|---|---|---|---|
| EP | 2 592 116 A1 | 5/2013 | |
| JP | 01-149699 A | 6/1989 | |
| JP | 03-151220 A | 6/1991 | |
| JP | 2005-307090 A | 11/2005 | |
| JP | 2006-274073 | * 10/2006 | |
| JP | 2006-274073 A | 10/2006 | |
| JP | 2007-043597 A | 2/2007 | |
| JP | 2010-268033 A | 11/2010 | |
| WO | 2013/088964 A1 | 6/2013 | |
| WO | 2013/088968 A1 | 6/2013 | |

OTHER PUBLICATIONS

International Preliminary Report on Patentability with translation of Written Opinion dated Jan. 24, 2017, issued by the International Searching Authority in application No. PCT/JP2015/070457.
International Search Report of PCT/JP2015/070457 dated Oct. 20, 2015.
Communication dated Nov. 28, 2017, from European Patent Office in counterpart application No. 15822172.1.

* cited by examiner

*Primary Examiner* — William K Cheung
(74) *Attorney, Agent, or Firm* — Sughrue Mion, PLLC

(57) ABSTRACT

The present invention aims to provide a film having excellent mechanical strength and abrasion resistance. The film of the present invention contains an aromatic polyether ketone resin (I) and a fluororesin (II). The aromatic polyether ketone resin (I) has a crystallinity of 10% or higher.

10 Claims, No Drawings

FILM AND METHOD FOR PRODUCING SAME

CROSS REFERENCE TO RELATED APPLICATIONS

This application is a National Stage of International Application No. PCT/JP2015/070457 filed Jul. 16, 2015, claiming priority based on Japanese Patent Application No. 2014-148074 filed Jul. 18, 2014, the contents of all of which are incorporated herein by reference in their entirety.

TECHNICAL FIELD

The present invention relates to films and methods for producing the same.

BACKGROUND ART

Engineering plastics such as aromatic polyether ketone resin are thermoplastic resins having high heat resistance, high mechanical strength, and high dimension stability, and thus are used in various applications.

Fluororesin has excellent properties such as slidability, heat resistance, chemical resistance, solvent resistance, weather resistance, flexibility, and electric properties, and is used in a wide variety of fields such as the automobile field, the industrial machinery field, the OA equipment field, and the electric and electronic equipment field. However, fluororesin is inferior to crystalline heat-resistant thermoplastic resin in mechanical properties and physical heat resistance represented by, for example, a heat deflection temperature in many cases. Further, fluororesin is also inferior to amorphous heat-resistant thermoplastic resin in dimension stability. Thus, the field where fluororesin can be used is limited, as a matter of fact.

Under such circumstances, techniques of using thermoplastic resin and fluororesin in combination are studied. For example, Patent Literature 1 discloses a resin composition including an aromatic polyether ketone resin (I) and a fluororesin (II) capable of providing a molded article having both a low coefficient of kinetic friction and a high limiting PV value, wherein the fluororesin (II) is a copolymer of tetrafluoroethylene and a specific perfluoroethylenic unsaturated compound, the aromatic polyether ketone resin (I) and the fluororesin (II) satisfy a mass ratio (I)/(II) of 95:5 to 50:50 and a melt viscosity ratio (I)/(II) of 0.3 to 5.0, the fluororesin (II) is dispersed as particles in the aromatic polyether ketone resin (I), and the fluororesin (II) has an average dispersed particle size of smaller than 3.0 μm.

Patent Literature 2 discloses an insulated wire including a conductor (A) and an insulation layer (B) formed around the conductor (A), wherein the insulation layer (B) is formed from a resin composition containing an aromatic polyether ketone resin (I) and a fluororesin (II), the fluororesin (II) is a copolymer of tetrafluoroethylene and a specific perfluoroethylenic unsaturated compound, and the aromatic polyether ketone resin (I) and the fluororesin (II) satisfy a melt viscosity ratio (I)/(II) of 0.3 to 5.0.

CITATION LIST

Patent Literature

Patent Literature 1: WO 2013/088964
Patent Literature 2: WO 2013/088968

SUMMARY OF INVENTION

Technical Problem

Unfortunately, conventional films formed from a resin composition containing an aromatic polyether ketone resin (I) and a fluororesin (II) do not have sufficient abrasion resistance. Further, such conventional films do not satisfy the mechanical strength required for films of speaker diaphragms. There are no films excellent in both mechanical strength and abrasion resistance.

The present invention is devised in view of the above state of the art, and aims to provide a film having excellent mechanical strength and abrasion resistance. The present invention also aims to provide a diaphragm for speakers having excellent acoustic characteristics.

Solution to Problem

The inventors have studied films excellent in both mechanical strength and abrasion resistance and focused on the crystallinity of aromatic polyether ketone resin which has never been examined in conventional techniques. Then, the inventors have found that a film containing an aromatic polyether ketone resin having a crystallinity within a specific range and a fluororesin can have markedly improved mechanical strength and excellent abrasion resistance.

Specifically, the present invention relates to a film containing an aromatic polyether ketone resin (I) and a fluororesin (II), the aromatic polyether ketone resin (I) having a crystallinity of 10% or higher.

The fluororesin (II) is preferably a copolymer of tetrafluoroethylene and a perfluoroethylenic unsaturated compound represented by the following formula (1):

$$CF_2=CF-Rf^1 \qquad (1)$$

wherein $Rf^1$ is $-CF_3$ or $-ORf^2$; and $Rf^2$ is a C1-C5 perfluoroalkyl group.

The aromatic polyether ketone resin (I) and the fluororesin (II) preferably have a mass ratio (I):(II) of 40:60 to 99:1.

The fluororesin (II) is preferably dispersed as particles in the aromatic polyether ketone resin (I).

The fluororesin (II) preferably has an average dispersed particle size of 3.0 μm or smaller in the aromatic polyether ketone resin (I).

The aromatic polyether ketone resin (I) and the fluororesin (II) preferably have a melt viscosity ratio (I)/(II) of 0.01 to 5.0.

The fluororesin (II) preferably has a melt flow rate of 0.1 to 100 g/10 min.

The aromatic polyether ketone resin (I) is preferably polyether ether ketone.

The present invention also relates to a diaphragm for speakers including the above film.

The present invention also relates to a thrust washer including the above film.

Advantageous Effects of Invention

Since the film of the present invention has the aforementioned configuration, it has excellent mechanical strength and abrasion resistance. Further, the diaphragm for speakers of the present invention has excellent acoustic characteristics.

DESCRIPTION OF EMBODIMENTS

The film of the present invention contains an aromatic polyether ketone resin (I) and a fluororesin (II), and the aromatic polyether ketone resin (I) has a crystallinity of 10% or higher.

Since the film of the present invention satisfies that the aromatic polyether ketone resin (I) has a crystallinity of 10% or higher, it has markedly improved mechanical strength and abrasion resistance.

The film of the present invention also has excellent elongation although it has excellent mechanical strength and abrasion resistance.

The present invention will be described in detail below.

The film of the present invention contains an aromatic polyether ketone resin (I) and a fluororesin (II).

The aromatic polyether ketone resin (I) has a crystallinity of 10% or higher. The aromatic polyether ketone resin having a crystallinity of 10% or higher enables production of a film having markedly improved mechanical strength as well as excellent abrasion resistance. In order to further improve the mechanical strength and the abrasion resistance, the crystallinity is preferably 12% or higher, more preferably 13% or higher, still more preferably 15% or higher, particularly preferably 17% or higher, much more preferably 19% or higher.

In order to give excellent elongation to the film, the crystallinity is preferably 30% or lower. The crystallinity is more preferably 25% or lower.

The crystallinity means the crystallinity of the aromatic polyether ketone resin (I) in the film, not the crystallinity of the aromatic polyether ketone resin (I) as a material.

The crystallinity can be determined by wide angle X-ray diffraction at a scanning angle of 5 to 40 degrees using an X-ray diffraction device and calculation by the following formula:

$$\text{Crystallinity (\%)} = 100 \times (\text{peak area derived from the crystals of the aromatic polyether ketone resin (I)}) / (\text{peak area on the whole}).$$

Specifically, the wide angle X-ray diffraction is determined at an output of 40 kV-40 mA and a scanning angle of 5 to 40 degrees using an X-ray diffraction system Ultima III (RIGAKU Corp.) and analysis software JADE 6.0 (RIGAKU Corp.), and then the peak area derived from the crystals of the aromatic polyether ketone resin (I) and the peak area on the whole are calculated. Thereafter, the crystallinity can be calculated from the above formula.

The peak area on the whole is an area obtained by integrating all of the diffraction intensities determined at scanning angles within the range of 5 to 40 degrees (excluding the peak area derived from the crystals of the fluororesin (II)).

The peak area derived from the crystals of the fluororesin (II) is, for example, an area of the peak observed at around $2\theta=17.7$ degrees.

The peak area derived from the crystals of the aromatic polyether ketone resin (I) is an area obtained by adding up the peak areas derived from the crystals of the aromatic polyether ketone resin (I).

The peak derived from the crystals of the aromatic polyether ketone resin (I) depends on the type of the resin. For example, if the aromatic polyether ketone resin (I) is polyether ether ketone (PEEK), the peak area derived from the crystals of PEEK is the sum of the peak areas observed at around $2\theta=18.7$ degrees, 20.4 degrees, 22.3 degrees, and 28.6 degrees. The peak observed at around $2\theta=18.7$ degrees is presumably a peak derived from the (110) surface. The peak observed at around $2\theta=20.4$ degrees is presumably a peak derived from the (111) surface. The peak observed at around $2\theta=22.3$ degrees is presumably a peak derived from the (200) surface. The peak observed at around $2\theta=28.6$ degrees is presumably a peak derived from the (211) surface.

The film of the present invention preferably satisfies that the fluororesin (II) has a crystallinity of 30 to 35%. If the crystallinity of the fluororesin (II) is within the above range, the film of the present invention can have excellent mechanical strength, abrasion resistance, and elongation. The crystallinity of the fluororesin (II) can be determined by calculation of the peak area derived from the crystals of the fluororesin (II) and the peak area on the whole in the same manner as in the case of the aromatic polyether ketone resin (I), and calculation by the following formula:

$$\text{Crystallinity (\%)} = 100 \times (\text{peak area derived from the crystals of the fluororesin (II)}) / (\text{peak area on the whole}).$$

The peak area on the whole is an area obtained by integrating all of the intensities determined at scanning angles within the range of 5 to 40 degrees (excluding the peak area derived from the crystals of the aromatic polyether ketone resin (I)).

The peak area derived from the crystals of the fluororesin (II) is the sum of the peak areas derived from the crystals of the fluororesin (II).

The aromatic polyether ketone resin (I) is preferably at least one resin selected from the group consisting of polyether ketone, polyether ether ketone, polyether ketone ketone, and polyether ketone ether ketone ketone, more preferably at least one resin selected from the group consisting of polyether ketone and polyether ether ketone, still more preferably polyether ether ketone.

The aromatic polyether ketone resin (I) preferably has a melt viscosity of 0.25 to 1.50 kNsm$^{-2}$ at 60 sec$^{-1}$ and 390° C. The melt viscosity within the above range can lead to improved processability and enables production of a film having excellent mechanical strength and abrasion resistance. The lower limit of the melt viscosity is more preferably 0.80 kNsm$^{-2}$. The upper limit of the melt viscosity is more preferably 1.30 kNsm$^{-2}$.

The melt viscosity of the aromatic polyether ketone resin (I) is determined in conformity with ASTM D3835.

The aromatic polyether ketone resin (I) preferably has a glass transition temperature of 130° C. or higher. The glass transition temperature is more preferably 135° C. or higher, still more preferably 140° C. or higher. The glass transition temperature satisfying the above range enables production of a film having excellent heat resistance. The glass transition temperature is determined using a differential scanning calorimetry (DSC) device.

The aromatic polyether ketone resin (I) preferably has a melting point of 300° C. or higher. The melting point is more preferably 320° C. or higher. The melting point satisfying the above range can lead to improved heat resistance of the film. The melting point is determined using a differential scanning calorimetry (DSC) device.

The fluororesin (II) is preferably a melt-fabricable fluororesin, more preferably at least one selected from the group consisting of tetrafluoroethylene/perfluoroethylenic unsaturated compound copolymers, ethylene/tetrafluoroethylene copolymers, polychlorotrifluoroethylene, chlorotrifluoroethylene/tetrafluoroethylene copolymers, ethylene/chlorotrifluoroethylene copolymers, tetrafluoroethylene/vinylidene fluoride copolymers, polyvinylidene fluoride, and polyvinyl fluoride.

The perfluoroethylenic unsaturated compound is a compound represented by the following formula (1):

$$CF_2=CF-Rf^1 \quad (1)$$

wherein $Rf^1$ is $-CF_3$ or $-ORf^2$; and $Rf^2$ is a C1-C5 perfluoroalkyl group.

The fluororesin (II) is still more preferably a copolymer of tetrafluoroethylene (TFE) and a perfluoroethylenic unsaturated compound represented by the following formula (1):

$$CF_2=CF-Rf^1 \quad (1)$$

wherein $Rf^1$ is $-CF_3$ or $-ORf^2$; and $Rf^2$ is a C1-C5 perfluoroalkyl group. One fluororesin (II) may be used, or two or more fluororesins (II) may be used. If $Rf^1$ is $-ORf^2$, $Rf^2$ is preferably a C1-C3 perfluoroalkyl group.

Use of the above fluororesin (II) enables production of a film having excellent mechanical strength and abrasion resistance.

For example, if a non-melt-fabricable polytetrafluoroethylene is used, the film may have a low mechanical strength and may fail to have sufficiently low abrasion properties.

In order to provide a film having better mechanical strength and abrasion resistance, the perfluoroethylenic unsaturated compound represented by the formula (1) is preferably at least one selected from the group consisting of hexafluoropropylene and perfluoro(alkyl vinyl ethers). It is more preferably at least one selected from the group consisting of hexafluoropropylene, perfluoro(methyl vinyl ether), perfluoro(ethyl vinyl ether), and perfluoro(propyl vinyl ether), still more preferably at least one selected from the group consisting of hexafluoropropylene and perfluoro (propyl vinyl ether). It is particularly preferably hexafluoropropylene.

The fluororesin (II) is preferably formed from 80 to 99.5 mol % of TFE and 0.5 to 20 mol % of a perfluoroethylenic unsaturated compound represented by the formula (1). The lower limit of the amount of TFE constituting the fluororesin (II) is more preferably 85 mol %, still more preferably 87 mol %, particularly preferably 90 mol %, much more preferably 93 mol %. The upper limit of the amount of TFE constituting the fluororesin (II) is more preferably 97 mol %, still more preferably 95 mol %.

The lower limit of the amount of the perfluoroethylenic unsaturated compound represented by the formula (1) constituting the fluororesin (II) is more preferably 1 mol %, still more preferably 1.5 mol %, particularly preferably 4 mol %. The upper limit of the amount of the perfluoroethylenic unsaturated compound represented by the formula (1) constituting the fluororesin (II) is more preferably 15 mol %, still more preferably 13 mol %, particularly preferably 10 mol %.

In order to provide a film having better mechanical strength and abrasion resistance, the fluororesin (II) is preferably a perfluoropolymer. The fluororesin (II) is more preferably at least one selected from the group consisting of tetrafluoroethylene/perfluoro(alkyl vinyl ether) copolymers, tetrafluoroethylene/hexafluoropropylene copolymers, and tetrafluoroethylene/hexafluoropropylene/perfluoro(alkyl vinyl ether) copolymers. It is particularly preferably at least one selected from the group consisting of tetrafluoroethylene/hexafluoropropylene copolymers and tetrafluoroethylene/hexafluoropropylene/perfluoro(alkyl vinyl ether) copolymers.

The fluororesin (II) may also be preferably a tetrafluoroethylene/hexafluoropropylene/monomer α copolymer at a tetrafluoroethylene/hexafluoropropylene/monomer α mole ratio of (80 to 98.5)/(1.5 to 20)/(0 to 0.9). If the fluororesin (II) is this copolymer, the fluororesin (II) can be easily dispersed as fine particles in the aromatic polyether ketone resin (I), further improving the formability of the material into a film, and the mechanical strength and abrasion resistance of the resulting film. The above copolymer is better than tetrafluoroethylene/perfluoro(alkyl vinyl ether) copolymers containing 1 mol % or more of a perfluoro(alkyl vinyl ether) in that the above copolymer can achieve these effects. The monomer α is a monomer copolymerizable with tetrafluoroethylene and hexafluoropropylene. Examples of the monomer α include perfluoro(alkyl vinyl ethers).

The fluororesin (II) preferably has a melt viscosity of 0.3 to 3.0 $kNsm^{-2}$ at 60 $sec^{-1}$ and 390° C. The melt viscosity within the above range can improve the processability and enables production of a film having better mechanical strength and abrasion resistance. The lower limit of the melt viscosity is more preferably 0.4 $kNsm^{-2}$. The upper limit of the melt viscosity is more preferably 2.5 $kNsm^{-2}$, still more preferably 2.0 $kNsm^{-2}$.

The melt viscosity of the fluororesin (II) is determined in conformity with ASTM D3835.

The fluororesin (II) preferably has a melt flow rate (MFR) of 0.1 to 100 g/10 min, more preferably 5 to 40 g/10 min, still more preferably 10 to 40 g/10 min, determined at 372° C. and 5000-g load. The MFR within the above range can lead to a lower coefficient of kinetic friction of the film of the present invention and also improved mechanical strength and abrasion resistance. The lower limit of the MFR is much more preferably 12 g/10 min, particularly preferably 15 g/10 min. In order to reduce the coefficient of kinetic friction and improve the mechanical strength and the abrasion resistance, the upper limit of the MFR is much more preferably 38 g/10 min, particularly preferably 35 g/10 min.

The MFR of the fluororesin (II) is determined using a melt indexer in conformity with ASTM D3307-01.

The fluororesin (II) may have any melting point. Still, the fluororesin (II) is preferably in the molten state at a temperature at which the aromatic polyether ketone resin (I) to be used for molding is molten. Thus, the melting point of the fluororesin (II) is preferably a temperature not higher than the melting point of the aromatic polyether ketone resin (I). For example, the melting point of the fluororesin (II) is preferably 230° C. to 350° C. The melting point of the fluororesin (II) is determined as a temperature corresponding to the maximum value on a heat-of-fusion curve obtained using a differential scanning calorimetry (DSC) device at a temperature-increasing rate of 10° C./min.

The fluororesin (II) may have been treated with fluorine gas or ammonia by a known method.

In order to further improve the mechanical strength and the abrasion resistance, the film of the present invention preferably satisfies that the melt viscosity ratio (I)/(II) between the aromatic polyether ketone resin (I) and the fluororesin (II) (aromatic polyether ketone resin (I)/fluororesin (II)) is 0.01 to 5.0. The melt viscosity ratio (I)/(II) is more preferably 0.1 to 4.0, still more preferably 0.3 to 3.0, particularly preferably 0.5 to 2.5.

The film of the present invention preferably satisfies that the mass ratio (I):(II) between the aromatic polyether ketone resin (I) and the fluororesin (II) is 40:60 to 99:1. If the mass ratio of the fluororesin (II) to the aromatic polyether ketone resin (I) exceeds 60, the resulting film tends to have poor strength, while if the mass ratio thereof is lower than 1, the resulting film may have poor abrasion resistance. The mass ratio is more preferably 50:50 to 95:5, still more preferably 60:40 to 90:10.

The film of the present invention preferably satisfies that the fluororesin (II) is dispersed as particles in the aromatic polyether ketone resin (I). Such dispersion of the fluororesin (II) as particles can give excellent mechanical strength and abrasion resistance to the resulting film.

The film of the present invention preferably satisfies that the fluororesin (II) has an average dispersed particle size of 3.0 μm or smaller. If the average dispersed particle size is 3.0 μm or smaller, the formability of a material into a film can be excellent, and the resulting film can have better mechanical strength and abrasion resistance. Too large an average dispersed particle size may cause a failure in achieving sufficient mechanical strength and abrasion resistance.

In order to provide a film having better mechanical strength and abrasion resistance as well as a material having excellent formability into a film, the average dispersed particle size of the fluororesin (II) is more preferably 2.0 μm or smaller, still more preferably 1.0 μm or smaller, particularly preferably 0.3 μm or smaller.

The lower limit of the average dispersed particle size may be any value, and may be 0.01 μm.

The film of the present invention preferably satisfies that the fluororesin (II) has a maximum dispersed particle size of 10 μm or smaller. If the maximum dispersed particle size is 10 μm or smaller, the mechanical strength and the abrasion resistance may be improved.

In order to provide excellent formability of the material as well as improved mechanical strength and abrasion resistance of the resulting film, the maximum dispersed particle size of the fluororesin (II) is more preferably 5 μm or smaller, still more preferably 1 μm or smaller, particularly preferably 0.5 μm or smaller.

The average dispersed particle size and maximum dispersed particle size of the fluororesin (II) can be determined by microscopy on the film of the present invention using a confocal laser scanning microscope or microscopy on a ultrathin slice cut out of a pressed sheet produced from the film of the present invention using a transmission electron microscope (TEM) to provide an image, and then binarizing the resulting image using an optical analyzer.

The film of the present invention contains the aromatic polyether ketone resin (I) and the fluororesin (II), and optionally contain other components, if necessary. The optional components may be any components, and examples thereof include fibrous reinforcing materials such as potassium titanate whisker, glass fiber, asbestos fiber, carbon fiber, ceramic fiber, potassium titanate fiber, aramid fiber, and other high-strength fibers; inorganic fillers such as calcium carbonate, talc, mica, clay, carbon powder, graphite, and glass beads; colorants; inorganic or organic fillers usually used, such as flame retarders; stabilizers such as minerals and flakes; lubricants such as silicone oil and molybdenum disulfide; pigments; conductive agents such as carbon black; impact-resistance improvers such as rubber; and other additives.

The film of the present invention can be produced by a production method including molding a resin composition containing an aromatic polyether ketone resin (I) and a fluororesin (II) to provide a film, for example.

The resin composition can be produced under usual conditions using a mixer which is usually used for preparing molding compositions, such as a blending mill, a Banbury mixer, a pressure kneader, or an extruder. In order to reduce the average dispersed particle size of the fluororesin (II), the mixer is preferably a twin-screw extruder, and the twin-screw extruder preferably has a screw configuration satisfying L/D=35 or higher, still more preferably L/D=40 or higher, particularly preferably L/D=45 or higher. The L/D means effective length of screw (L)/screw diameter (D).

Accordingly, the resin composition is preferably one obtainable by mixing an aromatic polyether ketone resin (I) and a fluororesin (II) using a twin-screw extruder having a screw configuration satisfying L/D=35 or higher.

One example of a method of producing the resin composition is a method of mixing an aromatic polyether ketone resin (I) and a fluororesin (II) in a molten state, for example.

Sufficient kneading of the aromatic polyether ketone resin (I) and the fluororesin (II) leads to a resin composition with a desired dispersion state. The dispersion state has an influence on the mechanical strength and abrasion resistance of the film, and on the formability. Thus, in order to achieve a desired dispersion state in the film obtainable from the resin composition, the kneading method needs to be selected as appropriate.

One example of a method of producing the resin composition is a method including putting an aromatic polyether ketone resin (I) and a fluororesin (II) at an appropriate ratio into a mixer, adding other optional components as desired, and melt-kneading the components at a temperature not lower than the melting points of the resins (I) and (II), for example.

The optional components may be added to and mixed with the aromatic polyether ketone resin (I) and the fluororesin (II) in advance, or may be added when the aromatic polyether ketone resin (I) and the fluororesin (II) are blended with each other.

The temperature of the melt-kneading may be appropriately set in accordance with the types of the aromatic polyether ketone resin (I) and fluororesin (II) used, and is preferably 340° C. to 400° C., for example. The kneading time is usually 1 to 30 minutes.

The temperature of molding the resin composition in the above molding is preferably 340° C. or higher. The molding temperature is preferably lower than the temperature which is the lower of the decomposition temperatures of the fluororesin (II) and the aromatic polyether ketone resin (I). Such a molding temperature is preferably 340° C. to 400° C., more preferably 360° C. to 400° C., for example.

The molding step preferably includes molding a resin composition at 340° C. or higher and then cooling the resulting film. The cooling may be performed until the temperature reaches lower than 150° C., for example.

Examples of a method of molding the resin composition include melt-extrusion molding, calendar molding, press molding, and cast molding, in accordance with the type, use, shape, and other factors of the target film. In order to provide a uniform thin film, melt-extrusion molding is preferred.

The melt-extrusion molding may be performed using a T-die film-molding device by melting the resin composition, ejecting the molten composition into a film shape through a die, and then taking up the film using a cooling roll. The cylinder temperature of the T-die film-molding device may be appropriately set to a temperature within the range where the resin composition is molten. For example, the resin composition may be molded at 340° C. to 400° C. The cooling roll may be set to any temperature, and the temperature is preferably within a range of 150° C. to 270° C., more preferably within a range of 180° C. to 220° C. If the cooling roll temperature is lower than 150° C. or higher than 270° C., the crystallinity of the resin composition in the film may not increase. The time during which the molten film ejected from the die is in contact with the cooling roll may be adjusted within a range of 1 to 30 seconds.

In order to further crystalize the film, the production method may also preferably include heating (annealing) the molded film. The heating may be performed by placing the film in a mold, putting the whole mold into an oven, and then heating the workpiece. In order to progress the crystallization, the heating temperature is preferably within a range of 150° C. to 270° C., more preferably within a range of 180° C. to 220° C. The heating time may be 0.05 to 100 hours, for example.

Film molding and optional heating under the above conditions enable production of a film in which the crystallinity of the aromatic polyether ketone resin (I) is 10% or higher.

The thickness of the film of the present invention may be appropriately set in accordance with the target use thereof, and is usually 0.001 to 1 mm. For easy handleability, the thickness of the film is preferably 0.01 mm or greater, more preferably 0.05 mm or greater. The thickness is also preferably 0.7 mm or smaller, more preferably 0.5 mm or smaller.

Since the film of the present invention has excellent mechanical strength and abrasion resistance, as well as excellent heat resistance, chemical resistance, solvent resistance, strength, stiffness, low chemical permeability, dimension stability, incombustibility, electric properties, and durability, the film can be applied to various uses. Examples of applications of the film include films for speaker diaphragms, thrust washers, connectors, printed circuit boards, wrapping films for electric wires, heat-insulating bags, insulating tapes, RFID covers, battery protective films, spacer films, bearings, membrane switches, and release films. The film is especially suitable as a film for speaker diaphragms or a film for thrust washers.

The diaphragm for speakers of the present invention includes the above film. Conventional diaphragms for speakers are easily broken, and thus need improvement in mechanical strength. However, no diaphragms for speakers excellent in both acoustic characteristics and mechanical strength have ever been produced.

The inventors have performed studies on diaphragms for speakers having excellent acoustic characteristics to find that a diaphragm for speakers including the film having the above specific configuration with excellent mechanical strength and elongation (flexibility) can have excellent mechanical strength owing to the mechanical strength of the film while having excellent acoustic characteristics. Thereby, the inventors have completed the present invention.

In other words, the present invention is based on the finding that diaphragms for speakers including the film having the above specific configuration with excellent mechanical strength and flexibility can have a newly achieved characteristic, i.e., excellence in both acoustic characteristics and mechanical strength, and thus the above film is particularly suitable for the use in diaphragms for speakers.

The diaphragm for speakers of the present invention is used as a diaphragm (vibrating membrane) of speakers or earphones.

The present invention also relates to a speaker or an earphone including the diaphragm for speakers.

The diaphragm for speakers of the present invention usually has a thickness of 10 to 100 μm.

The diaphragm for speakers of the present invention may consist of the above film, or may have a stack structure of two or more layers including the film and another substrate.

In consideration of damping of vibration, the diaphragm for speakers of the present invention preferably has a structure in which the above film is stacked on one or both sides of the substrate, more preferably a trilayer structure in which the film is stacked on both sides of the substrate.

The above trilayer structure enables the diaphragm for speakers of the present invention to have excellently stable frequency characteristics. For good performance as and good strength of speakers, preferably, the substrate of the diaphragm for speakers having the trilayer structure has a thickness of 5 to 50 μm and the film disposed on each side of the substrate has a thickness of 2 to 20 μm.

The substrate may be one usually used as a material of diaphragms, and examples thereof include substrates formed from polyimide, polyamide-imide, polyetherimide, polyethylene naphthalate, polyethylene terephthalate, and urethane polymers.

The thrust washer of the present invention includes the above film. Conventional thrust washers are unfortunately easily cracked and easily worn at high load.

On the contrary, the thrust washer of the present invention has excellent mechanical strength and abrasion resistance owing to the presence of the above film, and thus can solve the problems.

In specific embodiments of the thrust washer of the present invention, the film may be disposed on the surface of a molded article in the form of a thrust washer. The molded article in the form of a thrust washer may be formed from a material which is usually used as a material of thrust washers, and examples of the material include polyoxymethylene, polyphenylene sulfide, and polyamide.

EXAMPLES

The present invention will be described referring to, but not limited to, examples.

The following will describe methods of determining the values in the examples and comparative examples.

<Method of Determining Crystallinity of Aromatic Polyether Ketone Resin>

The crystallinity was determined as follows. Specifically, the wide angle X-ray diffraction was determined at an output of 40 kV-40 mA and a scanning angle of 5 to 40 degrees using an X-ray diffraction system, and then the peak area derived from the crystals of the aromatic polyether ketone resin (1) and the peak area on the whole were calculated. Thereafter, the crystallinity was calculated by the following formula:

$$\text{Crystallinity (\%)} = 100 \times (\text{peak area derived from the crystals of the aromatic polyether ketone resin (1)}) / (\text{peak area on the whole}).$$

The peak area on the whole is an area obtained by integrating all of the diffraction intensities determined at scanning angles within the range of 5 to 40 degrees (excluding the peak area derived from the crystals of the fluororesin (2)).

The peak area derived from the crystals of the aromatic polyether ketone resin (1) is an area obtained by adding up the peak areas derived from the crystals of the aromatic polyether ketone resin (1).

The peak area derived from the crystals of the fluororesin (2) is the peak area observed at around $2\theta=17.7$ degrees.

The peak area derived from the crystals of PEEK used in the examples and comparative examples is the sum of the peak areas observed at around $2\theta=18.7$ degrees, 20.4 degrees, 22.3 degrees, and 28.6 degrees. The peak observed at around 2θ=18.7 degrees is presumably a peak derived from the (110) surface. The peak observed at around 2θ=20.4 degrees is presumably a peak derived from the (111) surface. The peak observed at around 2θ=22.3 degrees is presumably a peak derived from the (200) surface. The peak observed at around 2θ=28.6 degrees is presumably a peak derived from the (211) surface.

<Method of Determining Modulus of Elasticity in Tension, Upper Yield Stress, and Tensile Elongation at Break>

The films obtained in the examples and comparative examples were each punched using an ASTM V-type dumbbell to provide a dumbbell-like specimen having a gauge length of 7.6 mm. Using the resulting dumbbell-like specimen, the modulus of elasticity in tension (MPa), the upper yield stress (MPa), and the tensile elongation at break (%) were determined at a temperature of 25° C., a chuck-to-chuck distance of 24.5 mm, and a tensile speed of 50 mm/min in conformity with ASTM D638. Table 1 shows the results.

<Method of Measuring Abrasion Loss>

The films obtained in the examples and comparative examples were each subjected to a friction abrasion test at a load of 500 N/cm$^2$ and a rotational speed of 0.5 m/sec for 60 minutes using a ring-on-disk friction abrasion tester and an S45C (outer diameter: 20.5 mm, inner diameter: 16.5 mm) ring. Thereby, the abrasion loss was measured.

<Determination of Coefficient of Kinetic Friction>

The films obtained in the examples and comparative examples were each subjected to a friction abrasion test at a load of 50 N/cm$^2$ and a rotational speed of 0.5 m/sec for 10 to 15 minutes using a ring-on-disk friction abrasion tester and an S45C (outer diameter: 20.5 mm, inner diameter: 16.5 mm) ring. Thereby, the coefficient of kinetic friction was determined.

<Determination of Melt Viscosity>

The melt viscosity of the aromatic polyether ketone resin was determined at 60 sec$^{-1}$ and 390° C. in conformity with ASTM D3835.

The melt viscosity of the fluororesin was determined at 60 sec$^{-1}$ and 390° C. in conformity with ASTM D3835.

<Measurement of MFR>

Using a melt indexer, the mass (g/10 min) of the polymer flowed out of a nozzle having an inner diameter of 2 mm and a length of 8 mm at a temperature of 372° C. and a load of 5000 g per 10 minutes was measured in conformity with ASTM D1238.

<Acoustic Effects>

The sound quality of the films obtained in the examples and comparative examples was evaluated by determining the frequency characteristics in conformity with JIS C5532.

The following materials were used in the examples and comparative examples.

Aromatic polyether ketone resin (1): polyether ether ketone (melt viscosity: 1.19 kNsm$^{-2}$)

Fluororesin (2): tetrafluoroethylene/hexafluoropropylene copolymer (tetrafluoroethylene/hexafluoropropylene/perfluoro(propyl vinyl ether)=87.5/11.5/1.0 (constitutional weight ratio), MFR: 23 g/10 min, melting point: 260° C., melt viscosity: 0.55 kNsm$^{-2}$ Examples 1 to 8

The aromatic polyether ketone resin (1) and the fluororesin (2) were pre-mixed at a ratio (parts by mass) shown in Table 1, and then melt-kneaded at a cylinder temperature of 390° C. and a screw rotation speed of 300 rpm using a twin-screw extruder. Thereby, a resin composition was produced.

Pellets of the resulting resin composition were fed to a T-die extruder for film molding, and then molded into a 25-μm-thick film at a cylinder temperature of 380° C., a die temperature of 380° C., and a screw rotation speed of 7 rpm, as well as a cooling roll temperature shown in Table 1. The extruded film was brought into contact with the cooling roll for 1 to 10 seconds.

Then, the films molded using a cooling roll set to 100° C. were subjected to crystallizing treatment under the annealing conditions shown in Table 1. Specifically, the resulting film was sandwiched between 120-mmφ molds and annealed at 220° C. for 0.1 to 3 hours in an oven.

Thereafter, using the resulting film, the crystallinity of the aromatic polyether ketone resin (1) (PEEK) and the modulus of elasticity in tension, tensile elongation at break, upper yield stress, abrasion loss, coefficient of kinetic friction, and acoustic effects of the film were determined.

Separately, a film consisting only of the fluororesin (2) was annealed in the same manner as for the films of the examples, and the crystallinity thereof was determined in the same manner as for the aromatic polyether ketone resin (1). The crystallinity of the film consisting only of the fluororesin (2) was 30 to 35%. This result shows that the crystallinity of the fluororesin (2) in the films of Examples 1 to 8 seemed to be 30 to 35%.

Comparative Examples 1 and 2

The film was produced in the same manner as in Example 1 except that the resulting film was not annealed in an oven. Then, using the resulting film, the crystallinity of PEEK and the modulus of elasticity in tension, tensile elongation at break, upper yield stress, abrasion loss, coefficient of kinetic friction, and acoustic effects of the film were determined.

TABLE 1

| | | Examples | | | | | | | | Comparative Examples | |
|---|---|---|---|---|---|---|---|---|---|---|---|
| | | 1 | 2 | 3 | 4 | 5 | 6 | 7 | 8 | 1 | 2 |
| Weight ratio of aromatic polyether ketone resin (1)/fluororesin (2) | | | | | 80/20 | | | 60/40 | | 80/20 | 60/40 |
| Cooling roll temperature | Annealing time (annealing conditions: 220° C.) | | | | | | | | | | |
| 100° C. | 0 Hours | | | | | | | | | ○ | ○ |
| | 0.5 Hours | ○ | | | | | | | | | |
| | 1 Hour | | ○ | | | | | | | | |

TABLE 1-continued

|  | | | | | | | | | | |
|---|---|---|---|---|---|---|---|---|---|---|
| 3 Hours | | ○ | | | | | | | | |
| 160° C. No annealing | | | | ○ | | | ○ | | | |
| 200° C. | | | | | ○ | | | ○ | | |
| 220° C. | | | | | | ○ | | | | |
| Crystallinity (%) | 13 | 19 | 22 | 12 | 17 | 23 | 11 | 17 | 6 | 7 |
| Modulus of elasticity in tension (MPa) | 2344 | 2951 | 3012 | 2373 | 2991 | 3239 | 2540 | 2724 | 2256 | 2350 |
| Tensile elongation at break (%) | 226 | 202 | 183 | 227 | 223 | 160 | 180 | 186 | 218 | 186 |
| Upper yield stress (MPa) | 72.1 | 95.4 | 94.1 | 67.3 | 90.2 | 91.5 | 51.7 | 68.5 | 60.7 | — |
| Abrasion loss (mg) | 1.3 | 0.8 | 0.3 | 1.5 | 0.9 | 0.3 | 1.7 | 1.0 | 2.0 | 2.4 |
| Coefficient of kinetic friction | 0.40 | 0.35 | 0.35 | 0.41 | 0.36 | 0.34 | 0.35 | 0.30 | 0.45 | 0.40 |
| Acoustic effects | Good | Excellent | — | Good | Excellent | — | Acceptable | Good | Poor | Poor |

INDUSTRIAL APPLICABILITY

Since the film of the present invention has excellent mechanical strength and abrasion resistance, it is suitably used as a film constituting, in particular, a diaphragm for speakers, a thrust washer, or the like.

The invention claimed is:

1. A film comprising:
   an aromatic polyether ketone resin (I); and
   a fluororesin (II),
   the aromatic polyether ketone resin (I) having a crystallinity of 15% or higher.

2. The film according to claim 1,
   wherein the fluororesin (II) is a copolymer of tetrafluoroethylene and a perfluoroethylenic unsaturated compound represented by the following formula (1):

$$CF_2=CF-Rf^1 \quad (1)$$

wherein $Rf^1$ is $-CF_3$ or $-ORf^2$; and $Rf^2$ is a C1-C5 perfluoroalkyl group.

3. The film according to claim 1,
   wherein the aromatic polyether ketone resin (I) and the fluororesin (II) have a mass ratio (I):(II) of 40:60 to 99:1.

4. The film according to claim 1,
   wherein the fluororesin (II) is dispersed as particles in the aromatic polyether ketone resin (I).

5. The film according to claim 4,
   wherein the fluororesin (II) has an average dispersed particle size of 3.0 μm or smaller in the aromatic polyether ketone resin (I).

6. The film according to claim 1,
   wherein the aromatic polyether ketone resin (I) and the fluororesin (II) have a melt viscosity ratio (I)/(II) of 0.01 to 5.0.

7. The film according to claim 1,
   wherein the fluororesin (II) has a melt flow rate of 0.1 to 100 g/10 min.

8. The film according to claim 1,
   wherein the aromatic polyether ketone resin (I) is polyether ether ketone.

9. A diaphragm for speakers, comprising the film according to claim 1.

10. A thrust washer comprising the film according to claim 1.

* * * * *